United States Patent
Barladian et al.

(10) Patent No.: US 10,131,435 B2
(45) Date of Patent: Nov. 20, 2018

(54) SYSTEM AND METHOD FOR PROVIDING TEMPERATURE CONTROL

(71) Applicant: ISRAEL AEROSPACE INDUSTRIES LTD., Lod (IL)

(72) Inventors: Alexander Barladian, Ashdod (IL); Arie Smolansky, Beit Yitzhak-Sha'ar Hefer (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 46 days.

(21) Appl. No.: 15/127,868

(22) PCT Filed: Mar. 25, 2015

(86) PCT No.: PCT/IL2015/050317
§ 371 (c)(1),
(2) Date: Sep. 21, 2016

(87) PCT Pub. No.: WO2015/145440
PCT Pub. Date: Oct. 1, 2015

(65) Prior Publication Data
US 2017/0088271 A1    Mar. 30, 2017

(30) Foreign Application Priority Data
Mar. 26, 2014 (IL) .......................... 231727

(51) Int. Cl.
*B60H 1/00* (2006.01)
*B64D 13/08* (2006.01)
(Continued)

(52) U.S. Cl.
CPC ............ *B64D 13/08* (2013.01); *B64C 39/024* (2013.01); *B64D 13/06* (2013.01);
(Continued)

(58) Field of Classification Search
CPC .................... B64D 13/08; B64D 13/06; B64D 2013/0614; B64D 2013/0618;
(Continued)

(56) References Cited

U.S. PATENT DOCUMENTS 3,934,642 A * 1/1976 Coulson ............ B60H 1/00007
165/203
4,461,155 A * 7/1984 Werjefelt ............... B64D 13/00
250/432 R (Continued)

FOREIGN PATENT DOCUMENTS

WO    WO2014/006309 A1    1/2014

OTHER PUBLICATIONS

International Search Report and Written Opinion from International Application No. PCT/IL2015/050317 dated Jul. 14, 2015.

*Primary Examiner* — Justin Jonaitis
(74) *Attorney, Agent, or Firm* — Dorsey & Whitney LLP (57) ABSTRACT

Systems and methods are disclosed for providing a controlled temperature in a control volume. Such systems include a main chamber (defining the control volume), a mixing chamber and a gasflow source. The mixing chamber is in selective fluid communication with the main chamber, and has at least one mixing chamber inlet, and a ram air inlet for allowing ram airflow at a first temperature to be channeled into the mixing chamber. The gasflow source provides a source gasflow at a greater, second temperature to the mixing chamber. The mixing chamber provides the mixing chamber outflow at a third temperature by selectively allowing the ram airflow and the source gasflow in the mixing chamber to mix therein, or, by selectively allowing the ram airflow in the mixing chamber to flow to the main chamber (in absence of source gasflow). A controller is operative to provide a desired level for the third temperature.

23 Claims, 8 Drawing Sheets

(51) Int. Cl.
*B64C 39/02* (2006.01)
*B64D 13/06* (2006.01)

(52) U.S. Cl.
CPC ......... *B64D 2013/0614* (2013.01); *B64D 2013/0618* (2013.01); *B64D 2013/0688* (2013.01); *Y02T 50/56* (2013.01)

(58) Field of Classification Search
CPC .......... B64D 2013/0688; B64D 33/08; B64C 39/024; Y02T 50/56; B60H 1/16; B60H 1/18; B60H 1/00; B60H 2001/0015; B61D 27/00
USPC ... 165/202, 203, 205, 235, 253, 254, 41, 44, 165/FOR. 114
See application file for complete search history.

(56) References Cited

U.S. PATENT DOCUMENTS

| | | | | |
|---|---|---|---|---|
| 5,253,484 A | * | 10/1993 | Corman | B64D 13/00 454/76 |
| 5,516,330 A | * | 5/1996 | Dechow | B64D 13/08 165/235 |
| 5,897,079 A | * | 4/1999 | Specht | B64C 1/067 244/118.5 |
| 6,306,032 B1 | * | 10/2001 | Scheffler | B64D 13/08 244/129.2 |
| 8,123,460 B2 | | 2/2012 | Collette | |
| 2011/0196540 A1 | * | 8/2011 | Engelhardt | B64D 13/06 700/278 |
| 2011/0240795 A1 | | 10/2011 | Brugger et al. | |
| 2011/0306285 A1 | * | 12/2011 | Heuer | B64D 13/02 454/76 |
| 2013/0283816 A1 | | 10/2013 | Smith et al. | |

* cited by examiner

SYSTEM AND METHOD FOR PROVIDING TEMPERATURE CONTROL

TECHNOLOGICAL FIELD

The presently disclosed subject matter relates to systems and methods for providing temperature control.

PRIOR ART

References considered to be relevant as background to the presently disclosed subject matter are listed below:
U.S. Pat. No. 8,123,460
WO 2014/006309

Acknowledgement of the above references herein is not to be inferred as meaning that these are in any way relevant to the patentability of the presently disclosed subject matter.

BACKGROUND

There are many conventional electronic devices such as, for example, computer systems or avionics, and other types of devices, which generate waste heat during operation thereof. For many such devices, proper cooling thereof is essential, otherwise excessive heat generated by the devices can cause malfunctions and failure thereof. However, for at least some types of electronic devices overcooling the device can also potentially damage the devices or affect their proper functioning.

Many air vehicles, including UAV's and manned vehicles, carry such devices, and conventionally, such devices are often convection cooled.

In some cases, an air conditioning system is used for providing a controlled temperature environment to such devices by controllably cooling an airflow in a closed-loop arrangement. In other cases a ram air flow is directly heated, and the heated air flow is exclusively injected directly onto the devices to provide the desired temperature control. Such systems often require relatively high levels of power consumption, as well as a significant installation volume and weight.

GENERAL DESCRIPTION

According to an aspect of the presently disclosed subject matter, there is provided a system for providing a controlled temperature in a control volume, comprising:
  a main chamber defining the control volume, and having at least one main chamber inlet and one main chamber outlet;
  a mixing chamber having a mixing chamber outlet in selective fluid communication with said main chamber inlet, at least one mixing chamber inlet, and a ram air inlet different from said at least one mixing chamber inlet for allowing a ram airflow at a first temperature to be channeled into said mixing chamber;
  a gasflow source in selective fluid communication with said at least one mixing chamber inlet and configured for selectively providing a source gasflow at a second temperature to said mixing chamber, said second temperature being greater than said first temperature;
  wherein said mixing chamber is configured for:
    in the presence of said source gasflow in said mixing chamber, selectively allowing said ram airflow and said source gasflow in said mixing chamber to mix therein to provide a mixing chamber outflow to the main chamber (for example via said mixed chamber outlet and said main chamber inlet); or
    in the absence of said source gasflow, selectively allowing said ram airflow in said mixing chamber to flow to the main chamber to thereby provide a mixing chamber outflow;
  said mixing chamber outflow being at a third temperature at least at or near said main chamber inlet (for example at entry to said main chamber)
  a control system operative to control at least one of said ram airflow, said source gasflow and said mixing chamber outflow to provide a desired said third temperature at least at said main chamber inlet.

In particular, the ram airflow is a cooling ram airflow.

For example, said control system is operative to provide a said third temperature such as to maintain a temperature in said control volume within a preset operating temperature range between a preset minimum temperature and a preset maximum temperature. For example, said preset minimum temperature is $-35°$ C. and wherein said preset maximum temperature is $+55°$ C.

For example, the system comprises heating elements for controllably heating said source gasflow to a desired said second temperature. For example, said heating elements are electrical heating elements coupled to at least one of said gasflow source.

For example, the system comprises a first temperature sensor in said main chamber at or in the vicinity of said main chamber inlet, the first temperature sensor being in operative communication with said control system. For example, said control system operates to provide a desired said third temperature based at least partially on a sensed inlet temperature as sensed by said first temperature sensor.

For example, the system comprises a second temperature sensor in said main chamber at or in the vicinity of said main chamber outlet, the second temperature sensor being in operative communication with said control system. For example, said control system operates to provide a desired said third temperature based at least partially on a sensed outlet temperature as sensed by said second temperature sensor.

For example, the control system operates to increase at least one of the source gasflow, the second temperature, and the mixing chamber outflow, responsive to one of said sensed inlet temperature or said sensed outlet temperature reaching said preset minimum temperature. For example, the control system operates to cease said increase of at least one of the source gasflow, the second temperature, and the mixing chamber outflow, responsive to one of said sensed inlet temperature or said sensed outlet temperature being significantly above said preset minimum temperature.

For example, the control system operates to decrease at least one of the source gasflow and the second temperature, and/or to increase the mixing chamber outflow, responsive to one of said sensed inlet temperature or said sensed outlet temperature reaching said preset maximum temperature. For example, the control system operates to cease said decrease of at least one of the source gasflow and the second temperature, and/or to cease said increase of the mixing chamber outflow, responsive to one of said sensed inlet temperature or said sensed outlet temperature being significantly below said preset maximum temperature.

For example, the system comprises a first controllable variable pump operatively connected to the control system and configured for controllably varying the magnitude of said source gasflow (i.e., the mass flow rate or volume flow rate thereof) into said mixing chamber. For example, the system further comprises a first controllable valve operatively connected to the control system and configured for selectively closing flow of said source gasflow into said mixing chamber.

For example, the system comprises a second controllable variable pump operatively connected to the control system and configured for controllably varying the magnitude (i.e., the mass flow rate or volume flow rate thereof) of said mixing chamber outflow into said main chamber. For example, the system comprises a flow path connecting said mixing chamber outlet to said main chamber inlet, and the second controllable variable pump is provided along this flow path. For example, the system further comprises a second controllable valve operatively connected to the control system and configured for selectively closing flow of said mixing chamber outflow into said main chamber.

For example, said main chamber comprises an auxiliary outlet, and said gasflow source comprises a recirculation conduit connecting said auxiliary outlet to said mixing chamber inlet and configured for providing a recirculating airflow from said main chamber into the mixing chamber to thereby provide said source gasflow. For example, said recirculation airflow is a first proportion of said mixing chamber outflow. For example, said first proportion is between 0% and 100%, or between 0% and 70%, or between 30% and 70%, of said mixing chamber outflow. For example, the system comprises a first heating system coupled to said recirculation conduit to selectively heat said recirculation airflow to provide a desired said second temperature to said source gasflow.

For example, said gasflow source comprises an auxiliary ram intake, in operation thereof being open to atmospheric air, and an auxiliary conduit connecting said auxiliary ram intake to said mixing chamber inlet, wherein said auxiliary ram intake is configured for selectively channeling an atmospheric auxiliary airflow into the mixing chamber to thereby provide said source gasflow. For example, the system comprises a second heating system coupled to said auxiliary conduit to selectively heat said atmospheric auxiliary airflow to provide a desired said second temperature to said source gasflow.

For example, said gasflow source comprises a pressurized gas container, and a container conduit connecting said pressurized gas container to said mixing chamber inlet and configured for providing a pressurized gasflow into the mixing chamber to thereby provide said source gasflow. For example, the system comprises a third heating system coupled to said container conduit to selectively heat said pressurized gasflow to provide a desired said second temperature to said source gasflow.

For example, the system comprises a main ram intake, in operation thereof being open to atmospheric air, and a ram conduit connecting said main ram intake to said ram air inlet, wherein said main ram intake is configured for selectively channeling said ram airflow into said mixing chamber. The ram air is not heated by artificial means prior to entry into the mixing chamber. Thus the system has an absence of heaters for the ram airflow upstream of the mixing chamber.

For example, said main chamber accommodates electronic components. For example, herein said components are operational within said preset temperature range.

According to this aspect of the presently disclosed subject matter, there are also provided systems and methods for providing a controlled temperature in a control volume. Such systems include a main chamber (defining the control volume), a mixing chamber and a gasflow source. The mixing chamber has a mixing chamber outlet in selective fluid communication with the main chamber, at least one mixing chamber inlet, and a ram air inlet for allowing ram airflow at a first temperature to be channeled into the mixing chamber. The gasflow source provides a source gasflow at a greater, second temperature to the mixing chamber. The mixing chamber provides the mixing chamber outflow at a third temperature by selectively allowing the ram airflow and the source gasflow in the mixing chamber to mix therein, or, by selectively allowing the ram airflow in the mixing chamber to flow to the main chamber (in absence of source gasflow). A controller is operative to provide a desired level for the third temperature.

According to this aspect of the presently disclosed subject matter, there is also provided an air vehicle comprising the system as defined herein with respect to this aspect of the presently disclosed subject matter. For example, the air vehicle is a UAV.

According to an aspect of the presently disclosed subject matter, there is provided a method for providing a controlled temperature in a control volume, comprising:
  providing a ram airflow at a first temperature into a mixing chamber;
  selectively providing a source gasflow at a second temperature into said mixing chamber, said second temperature being greater than said first temperature; and
  wherein:
    in the presence of said source gasflow in said mixing chamber, selectively allowing said ram airflow and said source gasflow in said mixing chamber to mix therein to provide a mixing chamber outflow to the control volume; or
    in the absence of said source gasflow, selectively allowing said ram airflow in said mixing chamber to flow to the control volume to thereby provide a mixing chamber outflow;
  said mixing chamber outflow being at a third temperature at least at or near entry to the control volume;
  controlling at least one of said ram, airflow, said source gasflow and said mixing chamber outflow to provide a desired said third temperature at least at or near entry to the control volume.

For example, said third temperature such as to maintain a temperature in said control volume within a preset operating temperature range between a preset minimum temperature and a preset maximum temperature. For example, said preset minimum temperature is −35° C. and wherein said preset maximum temperature is +55° C.

For example, the method comprises providing a heating source and, using the heating source, controllably heating said source gasflow to a desired said second temperature.

For example, the method comprises providing a desired said third temperature based at least partially on a sensed inlet temperature as sensed at or in the vicinity of an inlet of the control volume.

For example, the method comprises providing a desired said third temperature based at least partially on a sensed outlet temperature as sensed at or in the vicinity of an outlet of the control volume. For example, the method comprises increasing at least one of the source gasflow, the second temperature, and the mixing chamber outflow, responsive to one of said sensed inlet temperature or said sensed outlet temperature reaching said preset minimum temperature. For example, the method comprises ceasing said increase of at least one of the source gasflow, the second temperature, and the mixing chamber outflow, responsive to one of said sensed inlet temperature or said sensed outlet temperature being significantly above said preset minimum temperature.

For example, the method comprises decreasing at least one of the source gasflow and the second temperature, and/or to increase the mixing chamber outflow, responsive to one of said sensed inlet temperature or said sensed outlet temperature reaching said preset maximum temperature. For example, the method comprises ceasing said decrease of at least one of the source gasflow and the second temperature, and/or to cease said increase of the mixing chamber outflow, responsive to one of said sensed inlet temperature or said sensed outlet temperature being significantly below said preset maximum temperature.

For example, the method comprises controllably varying the magnitude of said source gasflow into said mixing chamber.

For example, the method comprises controllably varying the magnitude of said mixing chamber outflow into the control volume. For example, the method comprises controllably varying the magnitude of said mixing chamber outflow into the control volume.

For example, the method comprises providing a recirculating airflow from the control volume into the mixing chamber to thereby provide said source gasflow. For example, said recirculation airflow is a first proportion of said mixing chamber outflow, and wherein said first proportion is between 0% and 100%, or between 0% and 70%, or between 30% and 70%, of said mixing chamber outflow. For example, the method comprises selectively heating said recirculation airflow to provide a desired said second temperature to said source gasflow.

For example, the method comprises selectively channeling an atmospheric auxiliary airflow into the mixing chamber, different from said ram, airflow, to thereby provide said source gasflow. For example, the method comprises selectively heating said atmospheric auxiliary airflow to provide a desired said second temperature to said source gasflow.

For example, the method comprises providing a pressurized gasflow into the mixing chamber to thereby provide said source gasflow. For example, the method comprises selectively heating said pressurized gasflow to provide a desired said second temperature to said source gasflow.

For example, the control volume accommodates electronic components.

A feature of at least some examples of the presently disclosed subject matter is that the cooling airflow, after being heated by heat exchange with the components during passage through the control volume, can be recirculated to the mixing chamber, and thus use can be made of this excess heat. In this manner, the ram air can be effectively heated to the desired temperature (in the mixing chamber) without the need for power to be expended in actively heating the ram airflow. In at least some examples, this can lead to a relatively simple, light system for providing a controlled temperature in the control volume, and having low power consumption. Thus, in at least some examples of the presently disclosed subject matter, the required equipment operation conditions (given a particular environmental air temperature) can be achieved with minimum power consumption, providing power saving. For example, a recirculating conduit can be provided between the control volume and the mixing chamber, and pumps can be used for providing a desired magnitude of recirculated flow of the flow in the control volume that is heated by passage therethrough (i.e., the source gasflow) to the mixing chamber, thereby providing a compact system with low capital cost and low operating costs.

A feature of at least some examples of the presently disclosed subject matter is that a system for providing a controlled temperature in the control volume can be provided that is simple, robust and of low cost.

A feature of at least some examples of the presently disclosed subject matter is that a system for providing a controlled temperature in the control volume can be provided that does not require many "moving parts" and for example can thus omit dynamic flappers, flow control valves, shutoff valves, and so on.

A feature of at least some examples of the presently disclosed subject matter is that a system for providing a controlled temperature in the control volume can be provided in which the desired temperature can be provided by controlling fans that drive the source gasflow into said mixing chamber.

A feature of at least some examples of the presently disclosed subject matter is that a system for providing a controlled temperature in the control volume can be provided in which there is homogeneity of the cooling flow into the control volume, in particular homogeneity in the temperature of the cooling flow into the control volume.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Referring to FIGS. 1 to 4, there is illustrated a system for providing a controlled temperature in a predefined volume (referred to herein as the control volume), according to a first example of the presently disclosed subject matter, the system being generally designated with the reference numeral 100. The system 100 comprises a main chamber 200 defining the control volume V, a mixing chamber 300, a gasflow source 400, and a control system 500 (also referred to interchangeably herein as a controller).

In particular, the system 100 selectively operates as a cooling system, for cooling the control volume V, in particular via convection.

Figure 5:
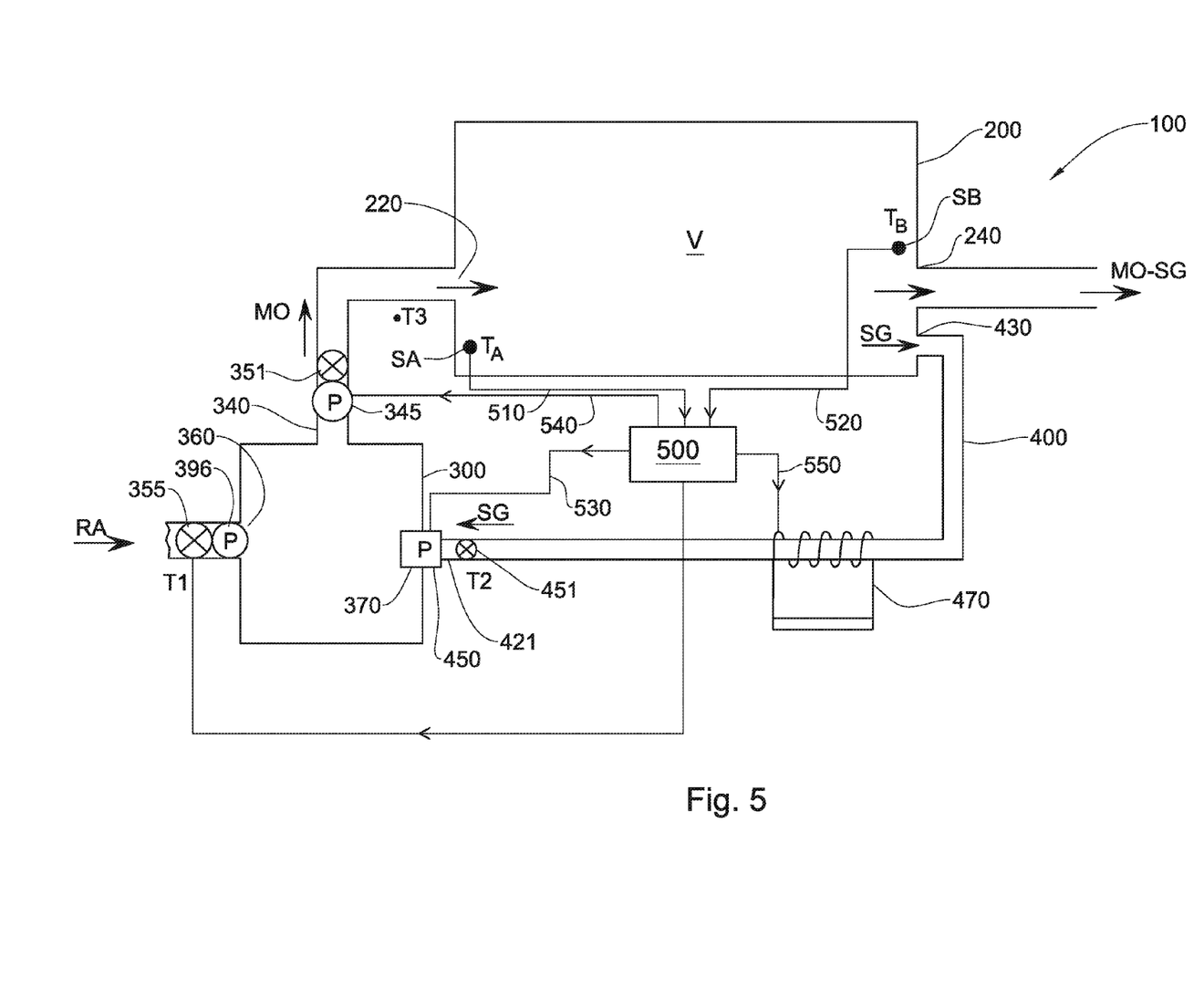
FIG. 5 schematically illustrates the components of the example of the system of FIGS. 1 to 4.

Reference is also made to FIG. 5, which schematically illustrates the components of the system 100, as disclosed herein.

The system 100 is particular configured for use in an air vehicle, for example a UAV, but can also be applied to manned vehicles in a similar manner, mutatis mutandis.

In this example, it is desired to regulate the temperature in the control volume V so that all parts thereof are kept within a desired temperature range. For example, the control volume V contains heat generating components, for example electronic components, that generate heat during operation thereof, and that must or should or that it is desired to be kept within a temperature range R, for example between a minimum temperature of about −35° and a maximum temperature of about +55°, to ensure proper working and/or to avoid damaging the components; thus, in this example, it is desired in particular to regulate the temperature in the control volume V so that any such heat generating components (e.g. electronic components) therein are kept within the desired temperature range.

Figure 1:
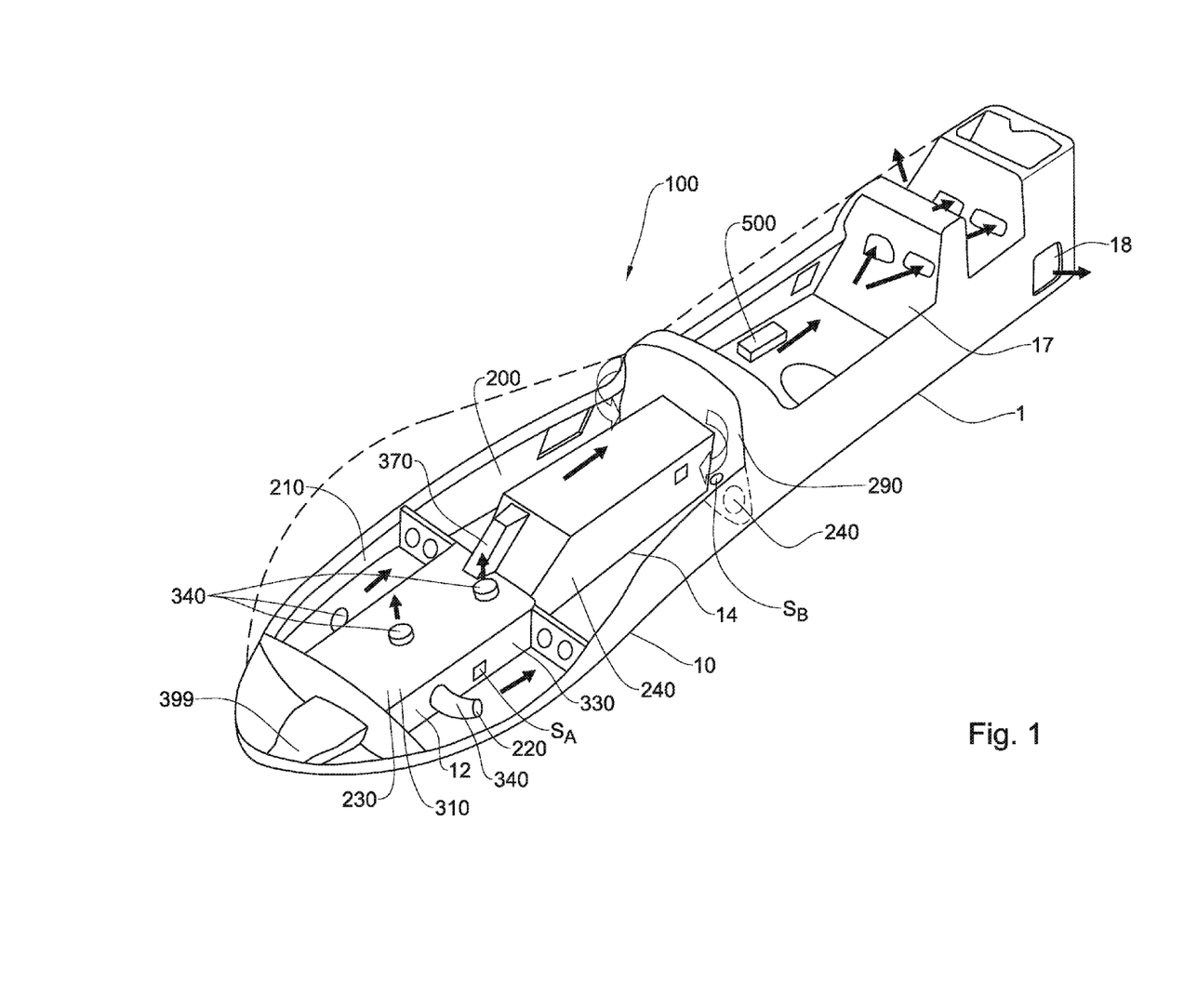
FIG. 1 is a partial, top-front isometric view of an air vehicle including a system for providing a controlled temperature in a control volume, according to a first example of the presently disclosed subject matter.
Figure 2:
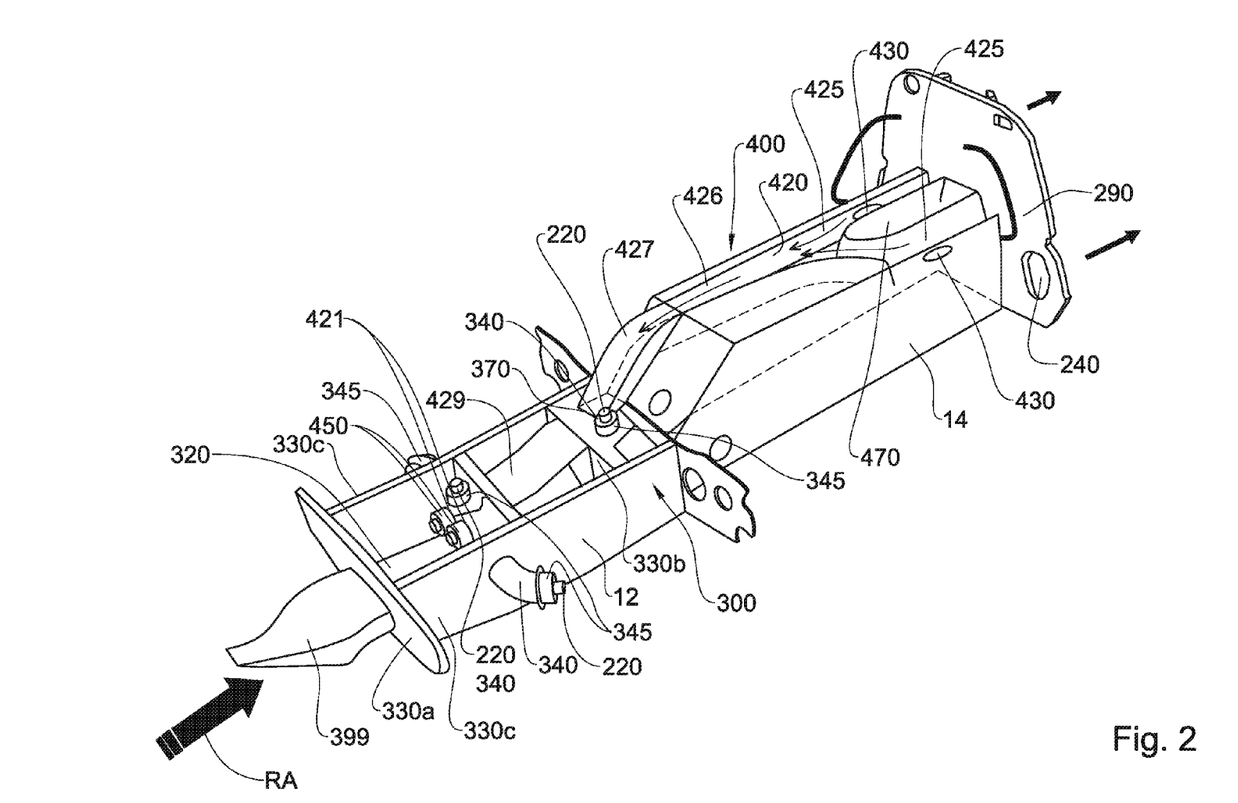
FIG. 2 is a partial top-front isometric view of the example of the system of FIG. 1.

Referring in particular to FIG. 1 and FIG. 2, the main chamber 200 in this example is provided by an internal portion of the forward fuselage 10 of an air vehicle 1 that includes a torsion box 12 and landing gear bay 14. In this example, the main chamber 200 is generally bounded by the internal walls 210 of the fuselage 10, the outer wall 230 of the torsion box 12 and the outer wall 240 of the landing gear bay 14, and having an aft end wall 290. It is evident, though, that the main chamber 200 can be extended to or defined by aft bay 17, or that the main chamber 200 can instead be provided elsewhere in the air vehicle 1, and/or can be provided as a self contained unit independent of the torsion box 12 and/or of the landing gear bay 14 and/or of the inside of the fuselage 10, as desired or required.

The main chamber 200 comprises a plurality of main chamber outlets 240, provided in aft end wall 290, although in alternative variations of this example, the main chamber 200 comprises one main chamber outlet 240, in the aft end wall or elsewhere. In any case, the main chamber outlets 240 allow outflow of air flowing out of the main chamber 200 into an aft part of the fuselage 10, and eventually is ejected from the air vehicle via a suitable vent 18, for example, or to allow outflow of air flowing out of the main chamber 200 directly out of the air vehicle.

The main chamber 200 further comprises a number of main chamber inlets 220 to allow airflow into the main chamber 200 from the mixing chamber 300. In this example, four main chamber inlets 220 are provided, though in alternative variations of this example, one, two, three, or more than four main chamber inlets 220 can be provided instead.

In this example, the mixing chamber 300 is partly defined by front wall 330a, rear wall 330b, and side walls 330c of the torsion box 12, and further comprises an upper wall 310 and lower wall 320, defined by an inside of the fuselage 10, for example. In alternative variations of this example, the mixing chamber 300 is provided as a self contained unit independent of the torsion box 12 and/or of the inside of the fuselage 10.

The mixing chamber 300 comprises a number of mixing chamber outlets 340 in selective fluid communication with the control volume V via the respective main chamber inlets 220. In this example, the number of mixing chamber outlets 340 is matched to the number of main chamber inlets 220, so that air flow into the main chamber 200 is exclusively via the mixing chamber 300, in particular via the mixing chamber outlets 340. Thus, in this example four mixing chamber outlets 340 are provided, though in alternative variations of this example, one, two, three, or more than four mixing chamber outlets 340 can be provided instead.

In this example, two of the mixing chamber outlets 340 are in the form of elbow tubings, extending laterally from the side walls 330c of the mixing chamber 300 (torsion box 12) and facing generally aft, and two additional mixing chamber outlets 340 are provided on the upper wall 310.

Referring to FIG. 2 in particular, each of the mixing chamber outlets 340 includes a controllable variable pump 345. In this example, each pump 345 is in the form of an electric fan, the operation of which is controlled by control system 500, and each pump 345 is operatively connected to the control system 500, represented by line 540 in FIG. 5. In alternative variations of this example, each mixing chamber outlet 340 includes a controllable valve, the operation of each valve being controlled by control system 500, operatively connected thereto. In yet other alternative variations of this example, the controllable valve, and/or the pump 345, can be omitted from system 100.

The mixing chamber 300 further comprises at least one mixing chamber inlet 370, for introducing a gasflow into the mixing chamber 300, as will become clearer below.

Figure 4:
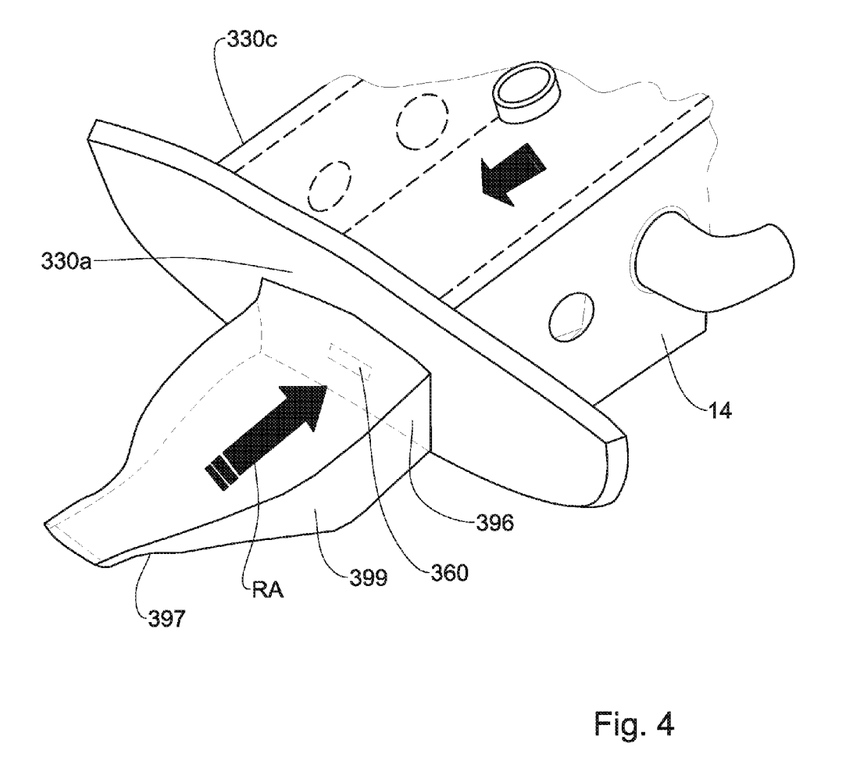
FIG. 4 is a partial, detail, top-front isometric view of a front part of the example of the system of FIG. 2.

The mixing chamber 300 further comprises a ram air inlet 360 (see FIG. 4), different from the mixing chamber inlet 370. A main ram intake 399 is mounted to the front wall 330a of the mixing chamber 300, having an intake end 397 and ram conduit 396, as best seen in FIG. 4. The intake end 397 is provided on an outside of the fuselage 10, and thus in operation main ram intake 399 is open to atmospheric air. The ram conduit 396 connects the main ram intake 399 to the ram air inlet 360, and thus the main ram intake is configured for selectively channeling a ram airflow RA (i.e., a flow of ram air having a particular mass flow rate or volume flow rate) into the mixing chamber 300 when the air vehicle 1 is in motion. The ram air inlet 360 thus allows the ram airflow RA to be channeled into the mixing chamber 300. The ram airflow RA usually provides a cooling airflow to the mixing chamber 300.

The mixing chamber 300 can be configured for enhancing mixing of the ram airflow RA and the source gasflow SG, to promote homogeneity of the mixed chamber outflow MO.

Figure 3:
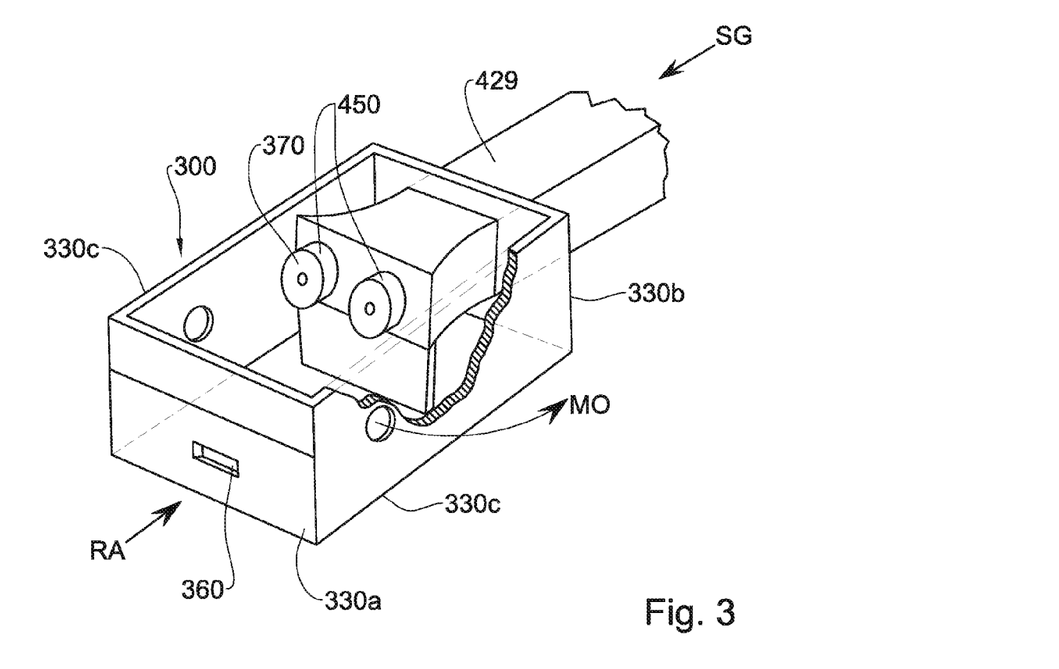
FIG. 3 is a partial, detail, top-front isometric view of the mixing chamber of the example of the system of FIG. 1.
Figure 3A:
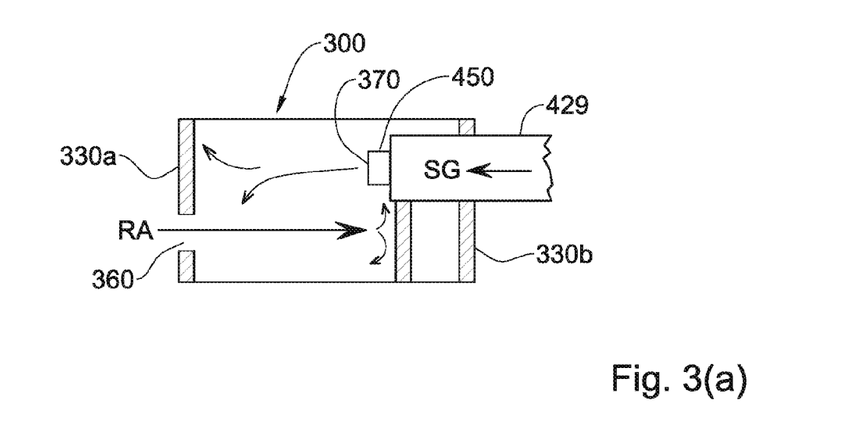
FIG. 3(a) is a cross-sectional side view of the example of FIG. 3.

For example, in this example, and as best seen in FIGS. 3 and 3(a), the mixing chamber 300 comprises a stagnation plate 301 longitudinally spaced from the ram air inlet 360, onto which the ram airflow RA impinges on entering the mixing chamber, and thereafter disperses in many different directions. The source gasflow SG enters the mixing chamber 300 via mixing chamber inlets 370, which are situated above the stagnation plate 301. This source gasflow SG impinges onto the inside of the front wall 330a, which also acts as a stagnation plate, and thereafter also disperses in many different directions. Both dispersed flows—the ram airflow RA and the source gasflow SG—provide high levels of turbulence within the mixing chamber 300, enhancing mixing of the two flows, to promote homogeneity of the mixed chamber outflow MO, and thus promotes homogeneity of the temperature of mixed chamber outflow MO. Thus, the cooling air provided to the control volume V has an improved homogeneity, particularly in temperature thereof.

Optionally, and referring to FIG. 5 in particular, the ram conduit 396 includes a controllable variable valve 355, for example at or near the ram air inlet 360. For example, the valve 355 is in the form of an electrically operable butterfly valve, the operation of which is controlled by control system 500, and each valve 355 is operatively connected to the control system 500, represented by line 560 in FIG. 5. The valve 355 enables the ram airflow RA to be regulated by the control system, and even to be shut off entirely when desired. In alternative variations of this example, each mixing chamber outlet 340 includes a controllable pump, the operation of each pump being controlled by control system 500, operatively connected thereto; such a pump can be selectively used to increase the ram airflow RA under certain circumstances.

The gasflow source 400 is in selective fluid communication with the mixing chamber inlet 370, and is configured for selectively providing a source gasflow SG (i.e., a flow of air or other gas from the gasflow source and having a particular mass flow rate or volume flow rate) to the mixing chamber 300.

The gasflow source 400 is in this example comprises a recirculation conduit in the form of a bifurcated duct 420 provided above the landing gear bay 14, as best seen in FIG. 2, though alternative ducting arrangements can also be used instead. The bifurcated duct 420 has two, aft-disposed branches 425 that join to form a single main duct 426, at a forward end. The gasflow source 400, in particular each branch 425 has an inlet 430 (corresponding effectively to an auxiliary outlet provided by the main chamber 200) at an aft end thereof, open to the main chamber 200. The main duct 426 includes an elbow section 427 downstream of the branches 425, and a forward section 429 projecting into the mixing chamber 300. The elbow section 427 is required in this example to account for the difference in height between the landing gear bay 14 and the mixing chamber 300, and thus can be omitted in alternative variations of this example in which there is no such difference in height, for example. The forward end of the forward section 429 comprises a pair of openings 421 corresponding to the mixing chamber inlet 370, each opening 421 including a controllable variable pump 450. In this example, each pump 450 is in the form of an electric fan, the operation of which is controlled by control system 500, and each pump 450 is operatively connected to the control system 500, represented by line 530 in FIG. 5. In at least this example, each pump 450 also effectively operates as a shut off valve, such that when it is not operating the source gasflow SG to the mixing chamber is reduced to zero, nominally.

The recirculation conduit thus essentially connects the inlet 430 (or auxiliary outlet of the main chamber 200) to the mixing chamber inlet 370 and is configured for providing a recirculating airflow from the main chamber 200 into the mixing chamber 300 to thereby provide the required source gasflow SG.

The gasflow source 400 thus selectively allows a portion Q of the air flowing through main chamber 200 (i.e., this portion defining the source gasflow SG) to be recirculated back into the mixing chamber 300, via openings 420, branches 425, main duct 426 and openings 421, selectively drawn from main chamber 200 by the action of the pumps 450.

The temperature of the ram airflow RA, referred to herein as the first temperature T1, is variable, and generally depends on atmospheric conditions as well as the airspeed of the air vehicle 1. In this example, the flow rate of the ram airflow RA also generally depends on atmospheric conditions (for example altitude) as well as the airspeed of the air vehicle 1. In general, the higher the flying altitude of the air vehicle, the colder temperature T1 becomes.

The temperature of the source gasflow SG, referred to herein as the second temperature T2, can also vary. In this example, the gasflow source 400 comprises a heat source in the form of a heating system coupled to said recirculation conduit to selectively heat the recirculation airflow to provide a desired second temperature T2 to the source gasflow SG. In this example, the heating system comprises a heater unit 470, including heating elements configured for controllably heating the source gasflow SG to a desired second temperature T2. In this example, the heating elements are electrical heating elements coupled to the gasflow source 400, such as to enable thermal communication and heat exchange between the heating elements and the source gasflow SG. In this example, the system 100 can optionally be operated without using the heater unit 470, in which case the second temperature T2 corresponds to the temperature of the airflow though the main chamber 200, at the inlet 430, and thus the temperature T2 is attained from the heat generated by the components in the volume V and removed therefrom by heat exchange with the mixed airflow MO. In alternative variations of this example, the heater unit 470 comprises a combustion system for burning a liquid or gaseous fuel in the source gasflow SG to selectively provide heat thereto.

In yet other alternative variations of this example, the heater unit 470 can be omitted, and thus the second temperature T2 corresponds to the temperature of the airflow though the main chamber 200, at the inlet 430, and thus the temperature T2 is attained from the heat generated by the components in the volume V and removed therefrom by heat exchange with the mixed airflow MO.

The heater unit 470 is operatively connected to the control system 500, represented by line 550 in FIG. 5.

The second temperature T2 thus generally depends on the temperature of the airflow through the main chamber 200, and/or on operation of the heater unit 470.

In general, the second temperature T2 is greater than the first temperature T1.

In this example, and referring in particular to FIG. 1, a temperature sensor SA is provided at or near one of the main chamber inlets 220, for determining the inlet temperature $T_A$ in the control volume V corresponding to main chamber inlets 220. In this example, the temperature sensor SA is provided in the main chamber 200, and is operatively connected to the control system 500, represented by line 510 in FIG. 5.

Another temperature sensor SB is provided at or near one of the main chamber outlets 240, for determining the outlet temperature $T_B$ in the control volume V corresponding to main chamber outlets 240. In this example, the temperature sensor SB is provided in the main chamber 200, and is operatively connected to the control system 500, represented by line 520 in FIG. 5.

Reference is now made in particular to FIG. 5, which, as already mentioned, schematically illustrates the components of the system 100, as disclosed above.

The mixing chamber 300 is configured to operate as follows:

(a) In the presence of the source gasflow SG flowing into the mixing chamber 300, the mixing chamber 300 is configured to selectively allow the ram airflow RA (provided via the main ram intake 399) and the source gasflow SG (provided by the gasflow source 400) in the mixing chamber 300 to continuously mix therein, to thereby provide a mixing chamber outflow MO (i.e., a flow of mixed air and/or gas from the mixing chamber and having a particular mass flow rate or volume flow rate) to the main chamber 200 (i.e., via the mixed chamber outlets 340 and the main chamber inlets 220).

(b) In the absence of said source gasflow SG, the mixing chamber 300 is configured to selectively allow the ram airflow RA in the mixing chamber 300 (provided via the main ram intake 399) to continuously flow to the main chamber 200, to thereby provide a mixing chamber outflow MO to the main chamber 200 (i.e., via the mixed chamber outlets 340 and the main chamber inlets 220).

In this example, the source gasflow SG, as a portion Q of the mixing chamber outflow MO, can nominally vary between 0% and 100% of said mixing chamber outflow MO. For example, with the pump 450 switched off so that nominally the source gasflow SG is zero, portion Q is 0%. For example, with the ram airflow RA at nominally zero (for example: the air vehicle has zero forward speed, for example on the ground; or very little forward speed close to stall; or where the valve 355 is closed and does not allow ram air to enter the mixing chamber), all of the mixing chamber flow MO can be recirculated as source gasflow SG, and thus portion Q is 100%.

In practice for this example, the system 100 can be set to operate such that this portion Q can vary between 0% and 70%, or between 30% and 70% of said mixing chamber outflow MO.

The mixing chamber outflow MO, at least at or near the main chamber inlets 220, is at a third temperature T3, the magnitude of which depends on the ratio of the ram airflow RA to the source gasflow SG, as well as on the first temperature T1 and the second temperature T2.

The control system 500 comprises any suitable computer system capable of receiving inputs from several sources, for example temperature sensors SA and SB, and for outputting command signals, for example to one or more of the pumps 345, 450, valve 355 and heat unit 470, for operation thereof, according to suitable command algorithms or truth tables programmed in the control system 500, and as set forth herein for example. Alternatively, the control system 500 can comprise an electronic digital or analog control system, operable in a similar manner.

The control system 500 is operative to control at least one of, and optionally any two of or all three of, the ram airflow RA, the source gasflow SG (optionally including the temperature T2 thereof) and the mixing chamber outflow MO, to modify the third temperature T3 at least at or near the main chamber inlets 220, such as to provide a desired inlet temperature $T_A$ and/or a desired outlet temperature $T_B$.

In particular, the control system 500 is operative to control the third temperature T3 and the mixing chamber outflow MO such that the control volume temperature, i.e., the temperature throughout the control volume V, remains within a preset operating temperature range between a preset minimum temperature and a preset maximum temperature $T_{max}$. For example, the mixing chamber outflow MO can be controlled directly via valve 351 and/or pump 345, or indirectly by controlling the ram airflow RA and/or the source gasflow SG.

For example, the preset minimum temperature $T_{min}$ is −35° C. and the preset maximum temperature $T_{max}$ is about 55° C. The control volume temperature is determined by one or both of the inlet temperature $T_A$ corresponding to main chamber inlets 220, determined by sensor SA, and the outlet temperature $T_B$ corresponding to main chamber outlets 240, determined by sensor SB.

In at least one mode of operation of the control system 500, the control system 500 operates to control the ram airflow RA, and/or source gasflow SG and/or the temperature T2, and/or and the mixing chamber outflow MO, to maintain the inlet temperature $T_A$ greater than the preset minimum temperature $T_{min}$ and/or to maintain the outlet temperature $T_B$ less than the preset maximum temperature $T_{max}$. Accordingly, the control system 500 can be programmed with suitable algorithms, with inputs corresponding to one or more of lines 510, 520, and outputs corresponding to one or more of lines 530, 540, 550, 560 to operate in this manner.

In one mode of operation, a desired third temperature T3 is provided by regulating or otherwise controlling the source gasflow SG via control system 500, by controlling the flow rate of the source gasflow SG via pumps 450 and/or by controlling the second temperature T2 thereof via the heating unit 470. For a fixed mixing chamber outflow MO, the higher the flow rate and/or the higher the second temperature T2 of the source gasflow SG, the higher the third temperature T3 becomes, and thus the higher the inlet temperature $T_A$ and the higher the outlet temperature $T_B$, which in turn also increases the second temperature T2 since the source gasflow SG originates from the main chamber 200. The converse also applies, i.e., for a fixed mixing chamber outflow MO, the lower the flow rate and/or the lower the second temperature T2 of the source gasflow SG, the lower the third temperature T3 becomes. In this mode of operation, the system 100 can omit pumps 345, 360, and valves 355, 351 and 451, and optionally also heating unit 470, so that the control of the temperature T3 is excursively by operating the pump 450 to provide a desired source gasflow SG to mix in the mixing chamber with ram airflow RA, thereby regulating the temperature at inlet to the control volume V.

In another mode of operation, a desired third temperature T3 is provided by regulating or otherwise controlling the mixing chamber outflow MO via control system 500, for example by controlling the flow rate of ram airflow RA via valve 355 and/or changing the airspeed and/or altitude of the air vehicle, and/or by controlling the valve 351 and/or pump 345. For example, for a source gasflow SG having a fixed flow rate and/or a fixed second temperature T2, the higher the mixing chamber outflow MO (which can be increased for example by increasing the ram airflow RA), the lower the third temperature T3 becomes. The converse also applies, i.e., for a source gasflow SG having a fixed flow rate and/or a fixed second temperature T2, the lower the mixing chamber outflow MO (which can be decreased for example by decreasing the ram airflow RA), the higher the third temperature T3 becomes.

For example, by the control system 500 operating to close the pumps 450, and thus setting the source gasflow SG to zero, the third temperature T3 is governed by the first temperature T1, as well as the magnitude of the mixing chamber outflow MO, which is controlled by pumps 345 and/or valve 351. The pumps 345 and/or valve 351 can also provide a back pressure to the ram airflow RA, which thus also affects the magnitude of the ram airflow RA into the mixing chamber 300. As the pumps 345 operate at a higher flow rating and/or as the valve 351 is opened more and more under the control of control system 500, while the magnitude of the temperature T3 may not change significantly for a fixed first temperature T1 (corresponding to constant airspeed and uniform atmospheric conditions), the greater flow rate of the mixing chamber outflow MO has a greater impact on the temperature of the main chamber 200.

Thus, again for the case of zero source gasflow SG, when the temperature in the main chamber 200 (as determined by inlet temperature $T_A$ or outlet temperature $T_B$) is higher than temperature T1, and it is desired to lower the temperature in the main chamber 200, the magnitude of the mixing chamber outflow MO is controlled by the control system 500 to reduce the measured inlet temperature $T_A$ or outlet temperature $T_B$ as desired.

The system 100 has the added feature that the source gas flow SG can be provided and further controlled to further control and fine-tune the temperature within the main chamber 200, and thus avoid temperatures lower than a desired preset minimum temperature and/or avoid exceeding a preset maximum temperature, anywhere within the control volume V. Effectively, this is carried out by mixing relatively warm air of the source gasflow SG at second temperature T2 with the relatively colder air of the ram air flow RA at temperature T1, to avoid providing very cold air to the control volume V when the first temperature T1 is below the preset minimum temperature $T_{min}$. In such cases, whenever the temperature T1 of the ram airflow RA is unacceptably low, it can be effectively increased by mixing with the source gasflow SG at second temperature T2.

In the example of FIGS. 1 to 4, a relatively warm source gasflow SG is economically provided by recirculating at least a portion Q of the flow through the control volume V, which has been heated by the heat generating components therein, for example by operating pump 450. This arrangement has few moving parts and often requires little power consumption for a large operating range of conditions for the air vehicle.

Furthermore, an adequate airflow mass flow rate can be provided through the control volume V to provide the required cooling, which can be somewhat independent of the first temperature T1. In other words, the system 100 can provide a relatively larger cooling airflow (i.e. mixed outflow MO) at a moderately cold temperature T3 (by mixing relatively warm source gasflow SG at second temperature T2 with colder ram inlet flow RA at very low temperature T1), as opposed to providing a relatively smaller cooling airflow at (i.e. mixed outflow MO) at a relatively colder temperature T3 (by not providing source gasflow SG at second temperature T2, and thus the mixed outflow MO corresponds to the colder ram inlet flow RA at very low temperature T1). It is possible that in both cases, the same global heat transfer may be achieved in the control volume V, and the same final average temperature may be provided in the cooling volume V. However, in the second case, some parts of the control volume V could be exposed to the very cold airflow at temperature T3 that is lower than the preset minimum temperature $T_{min}$, while in the first case this can be avoided altogether or the risk thereof significantly minimized by providing a cooling flow that has greater homogeneity in the temperature thereof.

Optionally, and as illustrated in FIG. 5, the system 100 comprises a first controllable valve 351 operatively connected to the control system 500 and configured for selectively closing the mixing chamber outflow MO into the main chamber 200.

Optionally, and as illustrated in FIG. 5, the system 100 comprises a second controllable valve 451, different from the pump 450, operatively connected to the control system 500 and configured for selectively closing the source gasflow SG into the mixing chamber 300.

Thus, the control system 500 selectively operates to deliver a mixing chamber outflow MO at a desired third temperature T3 based at least partially on inlet temperature $T_A$ as sensed by the first temperature sensor SA, and/or, the control system 500 operates to provide a mixing chamber outflow MO at a desired third temperature T3 based at least partially on outlet temperature $T_B$ as sensed by second temperature sensor SB.

Furthermore, the control system 500 selectively operates to increase at least one of the source gasflow SG, the second temperature T2, and the mixing chamber outflow MO, responsive to the inlet temperature $T_A$ or the outlet temperature $T_B$ reaching the preset minimum temperature $T_{min}$, to correspondingly control the third temperature T3. Conversely, the control system 500 selectively operates to cease said increase of at least one of the source gasflow, the second temperature, and the mixing chamber outflow MO, responsive to said third temperature being significantly above said preset minimum temperature $T_{min}$ and in particular exceeding the preset maximum temperature $T_{min}$.

Furthermore, the control system 500 selectively operates to decrease at least one of the source gasflow SG and the second temperature T2, and/or to increase the mixing chamber outflow MO, responsive to the inlet temperature $T_A$ or the outlet temperature $T_B$ reaching the preset maximum temperature $T_{max}$, to correspondingly control the third temperature T3. Furthermore, the control system 500 selectively operates to cease the decrease of at least one of the source gasflow SG and the second temperature T2, and/or to cease the increase of the mixing chamber outflow MO, to the inlet temperature $T_A$ or the outlet temperature $T_B$ being significantly below the preset maximum temperature $T_{max}$, to correspondingly control the third temperature T3.

Figure 6:
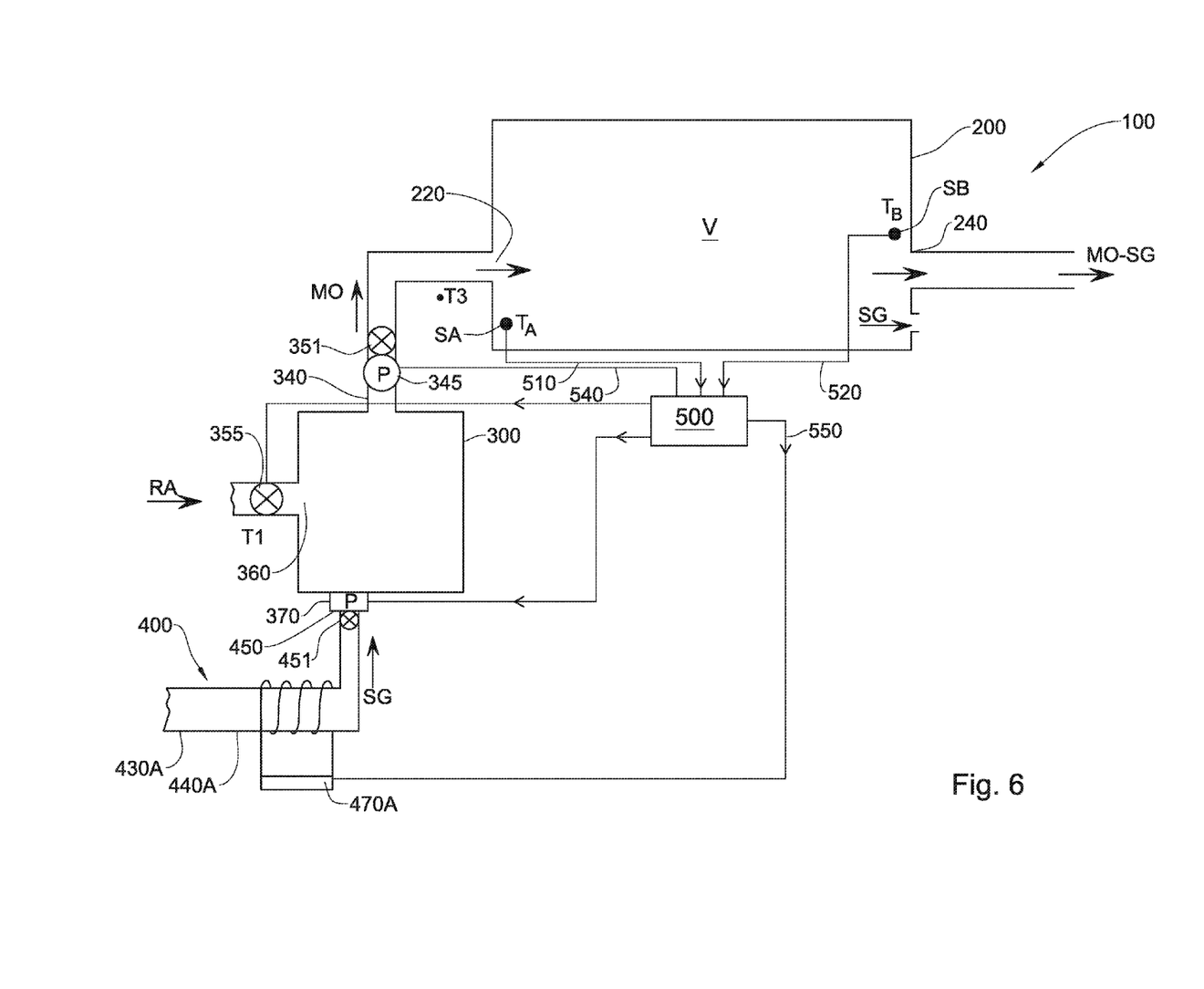
FIG. 6 schematically illustrates the components of an alternative variation of the example of the system of FIGS. 1 to 4.

In an alternative variation of the example of FIGS. 1 to 5, schematically illustrated in FIG. 6, the gasflow source 400 comprises an auxiliary ram intake 430A, instead of the recirculation circuit of FIG. 5. For example, the auxiliary ram intake 430A comprises an auxiliary intake end provided on an outside of the fuselage 10, and thus in operation the auxiliary ram intake 430A is open to atmospheric air. An auxiliary conduit 440A connects the auxiliary ram intake to the mixing chamber inlet 370 via variable pump 450 and valve 451, in a similar manner to that disclosed for the example of FIG. 5, mutatis mutandis. The auxiliary ram intake 430A is configured for selectively channeling an atmospheric auxiliary airflow into the mixing chamber 300 to thereby provide the source gasflow SG. In the example of FIG. 6, a second heating system 470A is provided, coupled to the auxiliary conduit 440A to selectively heat the atmospheric auxiliary airflow channeled by the auxiliary intake 430A, to provide a desired second temperature T2 to the source gasflow SG. In this example, the source gasflow SG is thus independent from the airflow through the main chamber 200. It is readily evident that the example of FIG. 6 can be modified to add thereto the recirculation circuit of FIG. 5, such that either one or both of the recirculation circuit and the auxiliary ram intake 430A selectively provide the source gasflow SG, as controlled by the control system 500.

Figure 7:
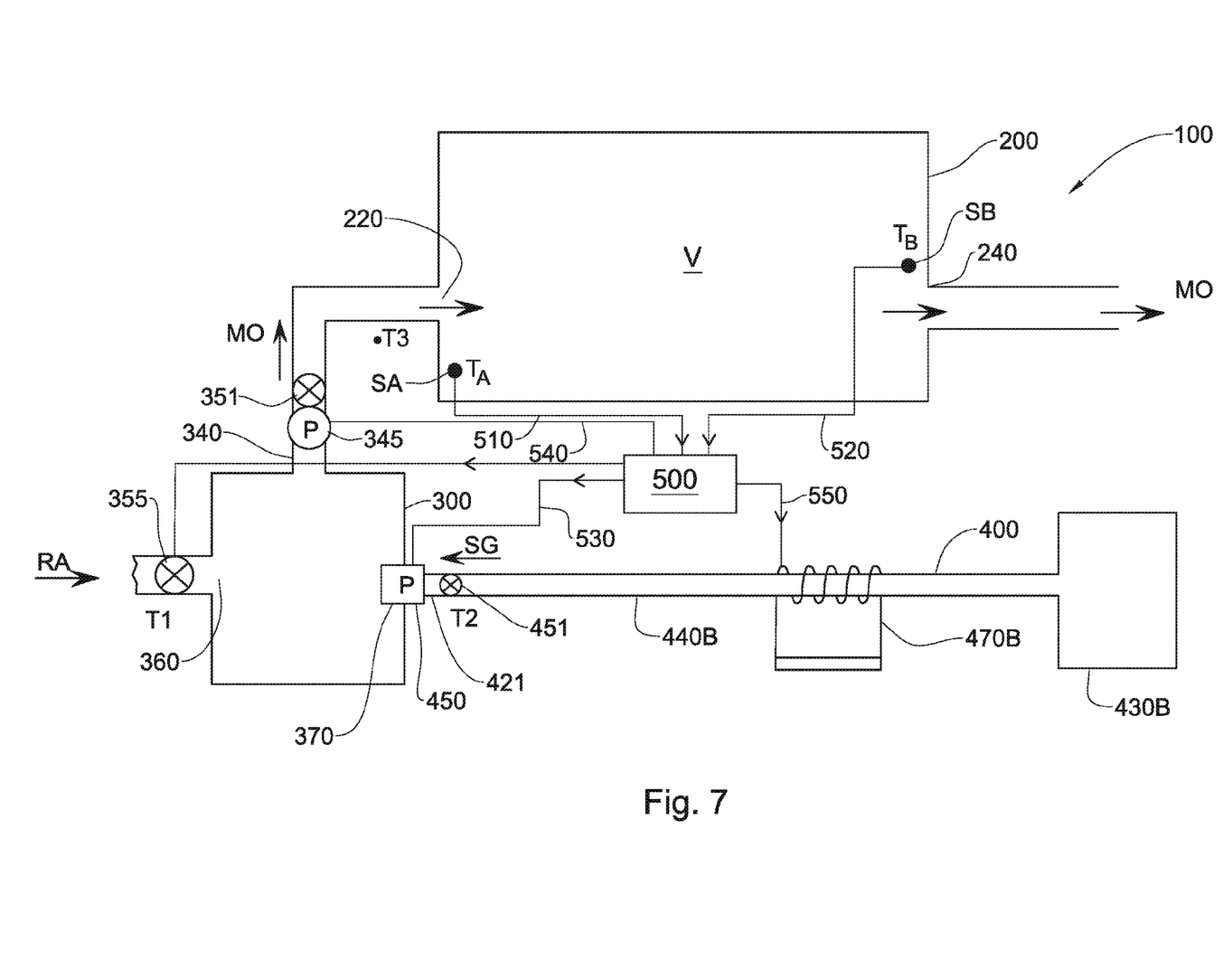
FIG. 7 schematically illustrates the components of another alternative variation of the example of the system of FIGS. 1 to 4.

In another alternative variation of the example of FIGS. 1 to 5, schematically illustrated in FIG. 7, the gasflow source 400 comprises a pressurized gas container 430B, instead of the recirculation circuit of FIG. 5. A container conduit 440B connects the pressurized gas container 430B to the mixing chamber inlet 370. The pressurized gas container 430B can contain any suitable gas in pressurized or liquefied form, for example air, nitrogen, and so on, and is configured for providing a pressurized gasflow into the mixing chamber 300 to thereby provide the required source gasflow SG. In the example of FIG. 7, a third heating system 470B is provided, coupled to the container conduit 440B to selectively heat the pressurize gasflow, to provide a desired second temperature T2 to the source gasflow SG. In this example, the source gasflow SG is thus independent from the airflow through the main chamber 200. It is readily evident that the example of FIG. 7 can be modified to add the recirculation circuit of FIG. 5, such that either one or both of the recirculation circuit and pressurized gas container 430B selectively provide the source gasflow SG, as controlled by the control system 500. It is also readily evident that the example of FIG. 7 can be modified to add the auxiliary ram intake 430A and the auxiliary conduit 440A and heating system 470A of the example of FIG. 6, such that either one or both of (a) the pressurized gas container 430B, and (b) the auxiliary ram intake 430A, auxiliary conduit 440A and heating system 470A of the example of FIG. 6, selectively provide the source gasflow SG, as controlled by the control system 500.

Figure 8:
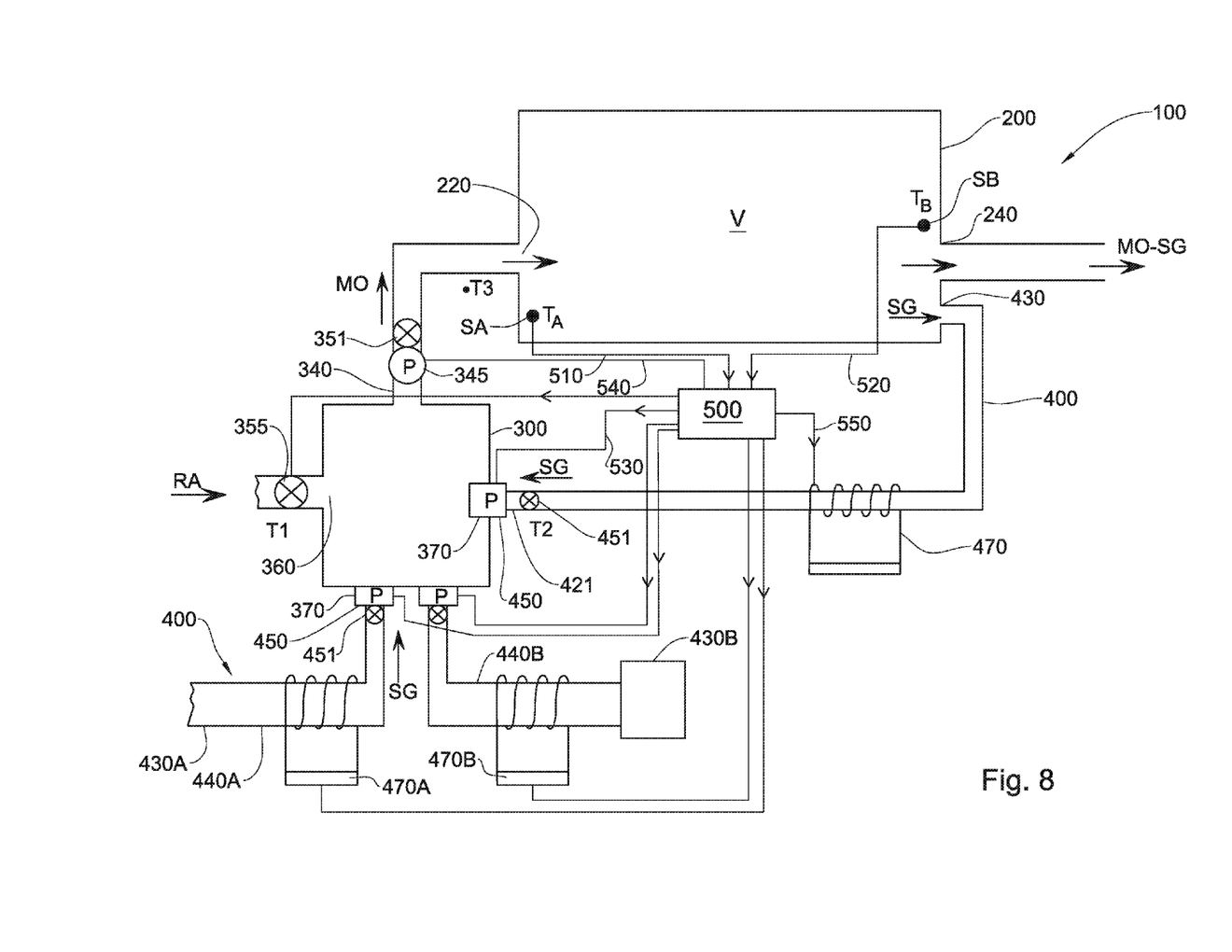
FIG. 8 schematically illustrates the components of another alternative variation of the example of the system of FIGS. 1 to 4.

In another alternative variation of the example of FIGS. 1 to 5, schematically illustrated in FIG. 8, the gasflow source 400 comprises, in addition to the recirculation circuit of FIG. 5, the auxiliary ram intake 430A and the auxiliary conduit 440A and heating system 470A of the example of FIG. 6, as well as the pressurized gas container 430B and heating system 470B of the example of FIG. 7. In this example, the control system 500 operates one or more of the elements of the gasflow source 400, i.e., one or more of (i) recirculation circuit and/or heating system 470, (ii) the auxiliary ram intake 430A and/or heating system 470A, and/or (iii) the pressurized gas container 430B and heating system 470B, to provide the desired source gasflow SG and desired second temperature T2.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A system for providing a controlled temperature in a control volume, the system comprising:
    a main chamber defining the control volume, the main chamber having at least one main chamber inlet and at least one main chamber outlet;
    a mixing chamber having a mixing chamber outlet in selective fluid communication with said at least one main chamber inlet, at least one mixing chamber inlet, and a ram air inlet different from said at least one mixing chamber inlet;
    a main ram intake, in operation thereof being open to atmospheric air, and a ram conduit connecting said main ram intake to said ram air inlet, wherein said main ram intake is configured for selectively channeling said ram airflow at a first temperature into said mixing chamber;
    a gasflow source in selective fluid communication with said at least one mixing chamber inlet and configured for selectively providing a source gasflow at a second temperature to said mixing chamber, said second temperature being greater than said first temperature;
    wherein said mixing chamber is configured for:
        in the presence of said source gasflow in said mixing chamber, selectively allowing said ram airflow and said source gasflow in said mixing chamber to mix therein to provide a mixing chamber outflow to the main chamber; or
        in the absence of said source gasflow, selectively allowing said ram airflow in said mixing chamber to flow to the main chamber to thereby provide a mixing chamber outflow;
        wherein said mixing chamber outflow being at a third temperature at least at said at least one main chamber inlet; and
    a control system operative to control at least one of said ram airflow, said source gasflow and said mixing chamber outflow to provide a desired said third temperature at least at said at least one main chamber inlet;
    wherein said main chamber includes an auxiliary outlet, and said gasflow source includes a recirculation conduit connecting said auxiliary outlet to said at least one mixing chamber inlet and configured for providing a recirculating airflow from said main chamber into the mixing chamber to thereby provide said source gasflow.

2. The system according to claim 1, wherein said control system is operative to provide said third temperature such as to maintain a temperature in said control volume within a preset operating temperature range between a preset minimum temperature and a preset maximum temperature.

3. The system according to claim 2, wherein said preset minimum temperature is −35° C. and wherein said preset maximum temperature is +55° C.

4. The system according to claim 1, further comprising a first temperature sensor in said main chamber at said at least one main chamber inlet, the first temperature sensor being in operative communication with said control system.

5. The system according to claim 4, wherein at least one of the following features:
    the control system operates to decrease at least one of the source gasflow and the second temperature, or to increase the mixing chamber outflow, responsive to one of said sensed inlet temperature or said sensed outlet temperature reaching said preset maximum temperature;
    the control system operates to decrease at least one of the source gasflow and the second temperature, and to increase the mixing chamber outflow, responsive to one of said sensed inlet temperature or said sensed outlet temperature reaching said preset maximum temperature
    the control system operates to decrease at least one of the source gasflow and the second temperature, and/or to increase the mixing chamber outflow, responsive to one of said sensed inlet temperature or said sensed outlet temperature reaching said preset maximum temperature, and, wherein the control system operates to cease said decrease of at least one of the source gasflow and the second temperature, or to cease said increase of the mixing chamber outflow, responsive to one of said sensed inlet temperature or said sensed outlet temperature being below said preset maximum temperature;
    the control system operates to decrease at least one of the source gasflow and the second temperature, and to increase the mixing chamber outflow, responsive to one of said sensed inlet temperature or said sensed outlet temperature reaching said preset maximum temperature, and, wherein the control system operates to cease said decrease of at least one of the source gasflow and the second temperature, and to cease said increase of the mixing chamber outflow, responsive to one of said sensed inlet temperature or said sensed outlet temperature being below said preset maximum temperature.

6. The system according to claim 1, further comprising a second temperature sensor in said main chamber at said main chamber outlet, the second temperature sensor being in operative communication with said control system.

7. The system according to claim 6, wherein at least one of the following features:
   the control system operates to increase at least one of the source gasflow, the second temperature, and the mixing chamber outflow, responsive to one of a sensed inlet temperature as sensed by said first temperature sensor or a sensed outlet temperature as sensed by said second temperature sensor reaching said preset minimum temperature; or
   the control system operates to increase at least one of the source gasflow, the second temperature, and the mixing chamber outflow, responsive to one of a sensed inlet temperature as sensed by said first temperature sensor or a sensed outlet temperature as sensed by said second temperature sensor reaching said preset minimum temperature, and, wherein the control system operates to cease said increase of at least one of the source gasflow, the second temperature, and the mixing chamber outflow, responsive to one of said sensed inlet temperature or said sensed outlet temperature being above said preset minimum temperature.

8. The system according to claim 1, further comprising at least one of:
   a first controllable variable pump operatively connected to the control system and configured for controllably varying the magnitude of said source gasflow into said mixing chamber; or
   a second controllable variable pump operatively connected to the control system and configured for controllably varying the magnitude of said mixing chamber outflow into said main chamber.

9. The system according to claim 1, wherein said recirculation airflow is a first proportion of said mixing chamber outflow.

10. The system according to claim 9, wherein said first proportion is between 30% and 70% of said mixing chamber outflow.

11. The system according to claim 1, further comprising a first heating system coupled to said recirculation conduit to selectively heat said recirculation airflow to provide a desired said second temperature to said source gasflow.

12. The system according to claim 1, wherein at least one of:
   said gasflow source comprises an auxiliary ram intake, in operation thereof being open to atmospheric air, and an auxiliary conduit connecting said auxiliary ram intake to said mixing chamber inlet, wherein said auxiliary ram intake is configured for selectively channeling an atmospheric auxiliary airflow into the mixing chamber to thereby provide said source gasflow;
   said gasflow source comprises an auxiliary ram intake, in operation thereof being open to atmospheric air, and an auxiliary conduit connecting said auxiliary ram intake to said mixing chamber inlet, wherein said auxiliary ram intake is configured for selectively channeling an atmospheric auxiliary airflow into the mixing chamber to thereby provide said source gasflow, and, comprising a second heating system coupled to said auxiliary conduit to selectively heat said atmospheric auxiliary airflow to provide a desired said second temperature to said source gasflow.

13. The system according to claim 1, wherein said gasflow source includes a pressurized gas container, and a container conduit connecting said pressurized gas container to said mixing chamber inlet and configured for providing a pressurized gasflow into the mixing chamber to thereby provide said source gasflow.

14. The system according to claim 1, further comprising a main ram intake, in operation thereof being open to atmospheric air, and a ram conduit connecting said main ram intake to said ram air inlet, wherein said main ram intake is configured for selectively channeling said ram airflow into said mixing chamber.

15. The system according to claim 1, wherein the mixing chamber comprises a stagnation plate longitudinally spaced from the ram air inlet.

16. An air vehicle comprising the system as defined in claim 1.

17. A method for providing a controlled temperature in a control volume, the control volume being defined by a main chamber having at least one main chamber inlet and one main chamber outlet, and an auxiliary outlet, the method comprising:
   (A) providing a main ram intake coupled to a mixing chamber, the main ram intake being open to atmospheric air, the mixing chamber having a ram air inlet, a mixing chamber outlet in selective fluid communication with the main chamber inlet, at least one mixing chamber inlet, and wherein the ram air inlet is different from the at least one mixing chamber inlet, and, selectively channeling an atmospheric ram airflow at a first temperature into the mixing chamber, to thereby provide said source gasflow;
   (B) selectively providing a source gasflow at a second temperature into said mixing chamber, said second temperature being greater than said first temperature; and wherein:
      in the presence of said source gasflow in said mixing chamber, selectively allowing said ram airflow and said source gasflow in said mixing chamber to mix therein to provide a mixing chamber outflow to the control volume; or
      in the absence of said source gasflow, selectively allowing said ram airflow in said mixing chamber to flow to the control volume to thereby provide a mixing chamber outflow;
   said mixing chamber outflow being at a third temperature at least at entry to the control volume;
   (C) controlling at least one of said ram airflow, said source gasflow and said mixing chamber outflow to provide a desired said third temperature at least at entry to the control volume; and
   (D) providing a recirculating airflow from the control volume into the mixing chamber via a recirculation conduit to thereby provide said source gasflow, wherein said recirculation conduit connects said auxiliary outlet to said mixing chamber inlet.

18. The method according to claim 17, wherein said third temperature such as to maintain a temperature in said control volume within a preset operating temperature range between a preset minimum temperature and a preset maximum temperature.

19. The method according to claim 18, wherein said preset minimum temperature is −35° C. and wherein said preset maximum temperature is +55° C.

20. The method according to claim 17, wherein at least one of the following features:
   providing a heating source and, using the heating source, controllably heating said source gasflow to a desired said second temperature;

providing a desired said third temperature based at least partially on a sensed inlet temperature as sensed at an inlet of the control volume;

providing a desired said third temperature based at least partially on a sensed outlet temperature as sensed at an outlet of the control volume;

providing a desired said third temperature based at least partially on a sensed outlet temperature as sensed at an outlet of the control volume, and, increasing at least one of the source gasflow, the second temperature, and the mixing chamber outflow, responsive to one of said sensed inlet temperature and said sensed outlet temperature reaching said preset minimum temperature;

providing a desired said third temperature based at least partially on a sensed outlet temperature as sensed at an outlet of the control volume, and, increasing at least one of the source gasflow, the second temperature, and the mixing chamber outflow, responsive to one of said sensed inlet temperature and said sensed outlet temperature reaching said preset minimum temperature, and, ceasing said increase of at least one of the source gasflow, the second temperature, and the mixing chamber outflow, responsive to one of said sensed inlet temperature and said sensed outlet temperature being above said preset minimum temperature;

providing a desired said third temperature based at least partially on a sensed outlet temperature as sensed at an outlet of the control volume, and, decreasing at least one of the source gasflow and the second temperature, and to increase the mixing chamber outflow, responsive to one of said sensed inlet temperature and said sensed outlet temperature reaching said preset maximum temperature;

providing a desired said third temperature based at least partially on a sensed outlet temperature as sensed at an outlet of the control volume, and, decreasing at least one of the source gasflow and the second temperature, and to increase the mixing chamber outflow, responsive to one of said sensed inlet temperature and said sensed outlet temperature reaching said preset maximum temperature, and, ceasing said decrease of at least one of the source gasflow and the second temperature, and to cease said increase of the mixing chamber outflow, responsive to one of said sensed inlet temperature or said sensed outlet temperature being below said preset maximum temperature.

21. The method according to claim 17, wherein at least one of the following features:
  controllably varying the magnitude of said source gasflow into said mixing chamber;
  controllably varying the magnitude of said mixing chamber outflow into the control volume;
  controllably varying the magnitude of said mixing chamber outflow into the control volume, and, controllably varying the magnitude of said mixing chamber outflow into the control volume.

22. The method according to claim 17, wherein said recirculation airflow is a first proportion of said mixing chamber outflow, and wherein said first proportion is between 30% and 70% of said mixing chamber outflow.

23. The method according to claim 17, further comprising at least one of the following features:
  selectively channeling an atmospheric auxiliary airflow into the mixing chamber, different from said ram, airflow, to thereby provide said source gasflow;
  providing a pressurized gasflow into the mixing chamber to thereby provide said source gasflow; or
  wherein the control volume accommodates electronic components.

* * * * *